United States Patent
Hassel et al.

(10) Patent No.: US 9,111,578 B1
(45) Date of Patent: Aug. 18, 2015

(54) RECORDING DENSITY VARIATION OF DATA TRACKS

(71) Applicant: Seagate Technology LLC, Cupertino, CA (US)

(72) Inventors: Michael Jay Hassel, Longmont, CO (US); Bruce Emo, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/339,432

(22) Filed: Jul. 23, 2014

(51) Int. Cl.
*G11B 5/09* (2006.01)
*G11B 20/12* (2006.01)

(52) U.S. Cl.
CPC .............. *G11B 20/1217* (2013.01); *G11B 5/09* (2013.01)

(58) Field of Classification Search
CPC ...... G11B 27/36; G11B 5/012; G11B 5/6005; G11B 5/59633; G11B 5/59627; G11B 5/5961
USPC .............. 360/48, 55, 75, 53, 77.02, 31, 78.04
See application file for complete search history.

(56) References Cited

U.S. PATENT DOCUMENTS

| | | | |
|---|---|---|---|
| 5,999,352 A | 12/1999 | Teck et al. | |
| 6,091,559 A | 7/2000 | Emo | |
| 6,182,250 B1 | 1/2001 | Ng | |
| 6,393,511 B1 | 5/2002 | Albrecht et al. | |
| 6,445,525 B1 | 9/2002 | Young | |
| 6,445,653 B1 | 9/2002 | Ng | |
| 6,446,156 B1 | 9/2002 | Chia | |
| 6,493,176 B1 | 12/2002 | Deng | |
| 6,765,737 B1 * | 7/2004 | Lim et al. | 360/48 |
| 6,943,972 B1 | 9/2005 | Chue | |
| 6,956,710 B2 | 10/2005 | Yun | |
| 7,012,771 B1 | 3/2006 | Asgari | |
| 7,046,466 B1 * | 5/2006 | Molstad et al. | 360/48 |
| 7,046,471 B2 | 5/2006 | Meyer et al. | |
| 7,317,596 B2 | 1/2008 | Albrecht | |
| 7,342,741 B1 | 3/2008 | Emo | |
| 7,362,529 B2 | 4/2008 | Chiao | |
| 7,392,439 B2 | 6/2008 | Seng et al. | |
| 7,515,376 B2 | 4/2009 | Emo | |
| 7,589,925 B1 | 9/2009 | Chiao | |
| 7,656,598 B2 * | 2/2010 | Iida | 360/31 |
| 7,800,856 B1 * | 9/2010 | Bennett et al. | 360/75 |
| 7,826,161 B2 * | 11/2010 | Riedel | 360/55 |
| 7,830,632 B2 * | 11/2010 | Tang et al. | 360/48 |
| 8,149,681 B2 * | 4/2012 | Hirayama | 369/275.3 |
| 8,599,510 B1 | 12/2013 | Fallone | |
| 8,665,545 B2 | 3/2014 | Coker | |
| 2013/0170064 A1 | 7/2013 | Kim | |

\* cited by examiner

*Primary Examiner* — Nabil Hindi
(74) *Attorney, Agent, or Firm* — Cesari & Reed LLP; Kirk A. Cesari; Christian W. Best

(57) ABSTRACT

Systems and methods are disclosed for recording density variation of data tracks. In some embodiments, an apparatus may comprise a circuit configured to record data to a first track of a data zone at a first recording density, and record data to a second track of the data zone at second recording density different from the first recording density. Recording density may be measured as a bits per inch (BPI) value for a data track. Different recording densities may be applied based on a width of the target track. In some embodiments, such as for shingled magnetic recording (SMR), data may be recorded to partially overlapped tracks at a first density, and to non-overlapped tracks at a second density.

20 Claims, 7 Drawing Sheets

RECORDING DENSITY VARIATION OF DATA TRACKS

SUMMARY

In certain embodiments, an apparatus may comprise a circuit configured to record data to a first track of a data zone at a first recording density, a data zone including a plurality of tracks less than all the tracks on a recording surface of a disc memory, and record data to a second track of the data zone at second recording density different from the first recording density.

In certain embodiments, an apparatus may comprise a data storage medium including a data zone, the data zone including a plurality of tracks less than all the tracks on a recording surface of the data storage medium, the data zone having a first track recorded at a first bits per inch (BPI) value, and a second track recorded at a second BPI value different from the first BPI value.

In certain embodiments, a memory device may store instructions that, when executed, cause a processor to perform a method comprising recording data to a first track of a data zone at a first recording density, a data zone including a plurality of tracks less than all the tracks on a recording surface of a disc memory, and recording data to a second track of the data zone at second recording density different from the first recording density.

DETAILED DESCRIPTION

Figure 1:
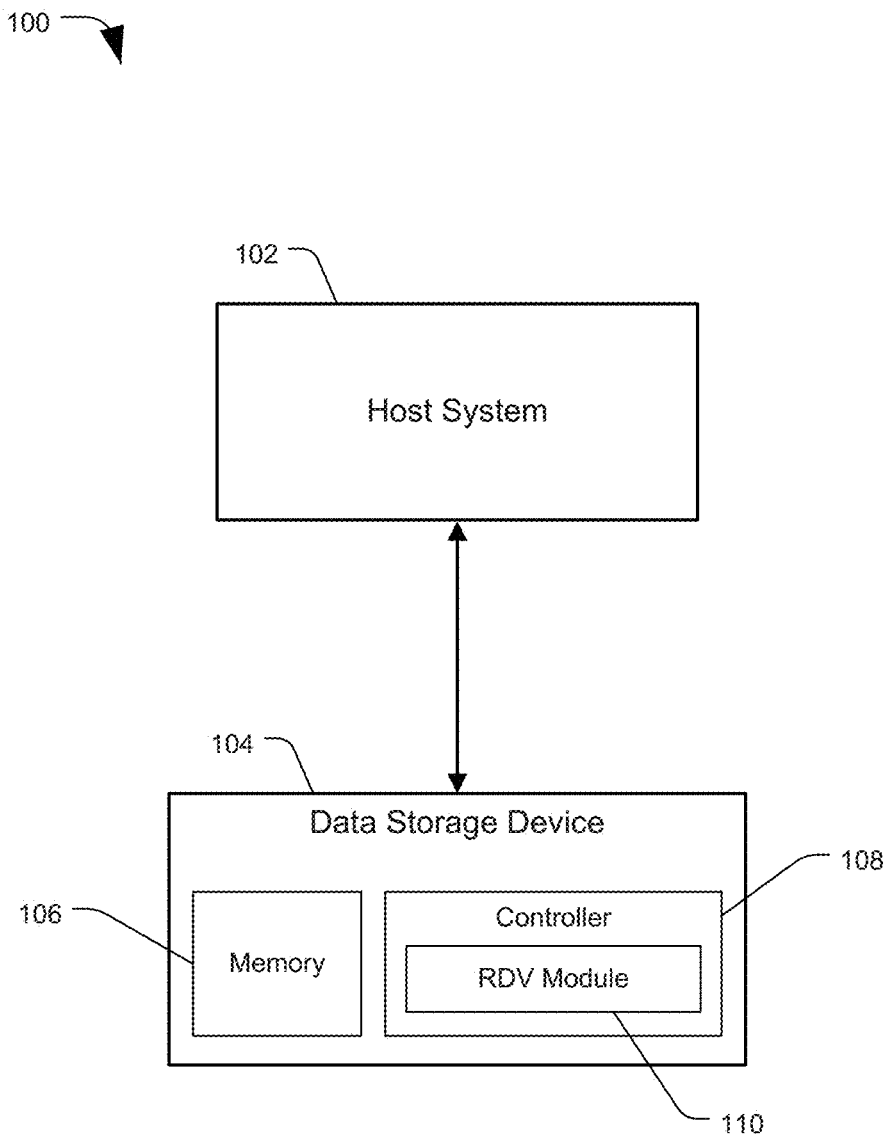
FIG. 1 is a diagram of a system having recording density variation of data tracks, in accordance with certain embodiments of the present disclosure.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that when executed cause a processor to perform the methods.

Data storage devices (DSDs), such as hard disc drives (HDDs) or hybrid hard drives (HHDs), may be used to store data. As data consumption and storage becomes more important, a corresponding increase in storage capacities of DSDs is desirable. In the case of disc-based storage mediums, the areal density capability (ADC) of a disc may depend on various factors. Data may be stored as bits to data storage tracks of HDDs, and accordingly the ADC may be based on an amount of tracks per inch (TPI), as well as a bits per inch (BPI) value for each of the tracks. The bits per inch value may be referred to as the recording density or bit density. As TPI and BPI values increase, resulting in a higher recording density, read heads may have greater difficulty accurately reading data from the tracks, resulting in a higher bit error rate (BER). If the BER becomes too high, performance of the DSD may suffer as error correction and read retry operations are performed. Therefore, discs of HDDs may be configured with TPI and BPI values to achieve a high ADC while maintaining an acceptable BER. In some embodiments, an overall higher ADC for a DSD may be achieved by selecting BPI values based on the characteristics of selected tracks.

In some embodiments, a disc recording medium may include a plurality of concentric data tracks on a recording surface of the disc, either in the form of individual tracks, or one or more gradually spiraling tracks. The surface of the disc may be divided into a plurality of concentric zones (sometimes called data zones), each zone including a plurality of contiguous data tracks. For example, a disc surface may include three zones: a first zone including the tracks at an inner diameter (ID) of the disc, a second zone including tracks at the middle diameter (MD) of the disc, and a third zone including tracks at the outer diameter (OD) of the disc. In some embodiments, a zone may include tracks having different widths or track pitches. For example, the width of a track may be a size of the track in a radial direction (e.g. from the ID to the OD). A track pitch may be a distance from a center of a track (e.g. read center or write center) to the center of an adjacent track. In some embodiments, such as in some shingled recording schemes, tracks may have the same track pitch but different track widths, as will be discussed in greater detail below. Data may be recorded to the tracks at different BPI rates based on the tracks' widths or track pitches.

FIG. 1 is a diagram of a system 100 having recording density variation of data tracks in accordance with certain embodiments of the present disclosure. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data, such as an HDD or HHD. The host 102 and DSD 104 may be connected by way of a wired or wireless connection, or by a local area network (LAN) or wide area network (WAN). In some embodiments, the DSD 104 can be a standalone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The memory 106 may comprise magnetic storage media such as disc drives, nonvolatile solid state memories such as Flash memory, other types of memory, or a combination thereof. The controller 108 may comprise one or more circuits or processors configured to control operations of the data storage device 104, such as storing data to or retrieving data from the memory 106. The DSD 104 may receive a data read or write request from the host device 102, and use the controller 108 to perform data operations on the memory 106 based on the request.

DSD 104 may include a recording density variation (RDV) module 110. The RDV module 110 may be one or more processors, controllers, or other circuits, or it may be a set of software instructions that, when executed by a processing device, perform the functions of the RDV module 110. In some embodiments, the RDV module 110 may be part of the controller 108, or executed by the controller 108. The RDV module 110 may control operations of DSD 104 relating varying recording density, such as the methods described in relation to FIGS. 6 and 7. For example, the RDV module 110 may control performance testing to select a bits per inch (BPI) recording density for selected areas of a data storage medium. In some embodiments, RDV module 110 may determine a BPI recording density for a target track of a write operation, and execute write operations at the determined recording density.

Figure 2:
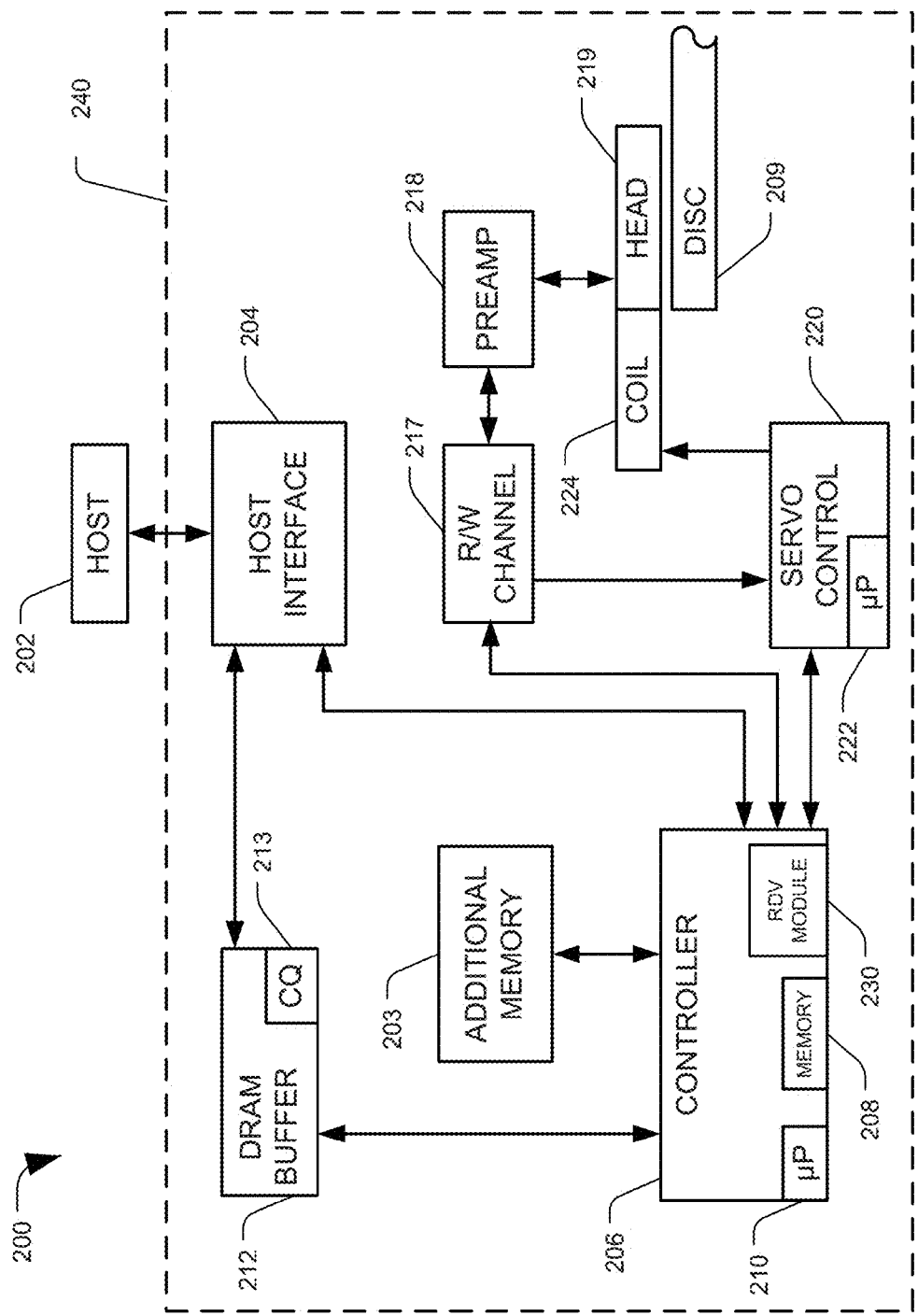
FIG. 2 is a diagram of a system having recording density variation of data tracks, in accordance with certain embodiments of the present disclosure.

FIG. 2 is a diagram of a system having recording density variation of data tracks, in accordance with certain embodiments of the present disclosure. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD 200 or the components of the DSD 200 may be attached to the housing, or a combination thereof. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of read-back signals. Head(s) 219 may include a read head element and a write head element (not shown). A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213. In some embodiments, the DSD 200 may include solid state memory instead of or in addition to disc memory. For example, the DSD 200 can include an additional memory 203, which can be either volatile memory such as DRAM or SRAM, or non-volatile memory, such as NAND Flash memory. The additional memory 203 can function as a cache and store recently or frequently read or written data, or data likely to be read soon. Additional memory 203 may also function as main storage instead of or in addition to disc(s) 209. A DSD 200 containing multiple types of non-volatile storage mediums, such as a disc(s) 209 and Flash 203, may be referred to as a hybrid storage device.

DSD 200 may include a recording density variation (RDV) module 230. The RDV module 230 may be a processor, controller, or other circuit, or it may be a set of software instructions that, when executed by a processing device, perform the functions of the RDV module 230. In some embodiments, the RDV module 230 may be part of the controller 108, or executed by the controller 206. The RDV module 230 may control operations of DSD 200 relating varying recording density, such as the methods described in relation to FIGS. 6 and 7. For example, the RDV module 230 may control performance testing to select a bits per inch (BPI) recording density for selected areas of a data storage medium. In some embodiments, RDV module 230 may determine a BPI recording density for a target track of a write operation, and execute write operations at the determined recording density.

As discussed, the data storage density of a disc memory 209 may be based in part on the BPI recording density of bits to a track of the disc 209. In some embodiments, controller 206 may control a density at which a write head 219 records data to a track. More data may be stored to a given track with a higher recording density than with a lower recording density. However, the signal-to-noise ratio (SNR) may decrease as density increases, which may result in more errors on reading the data. Therefore, the controller 206 may regulate the BPI recording density to match a selected value for a track currently being written. In some embodiments, the BPI may be regulated by a servo control circuit 220, by other components, or some combination thereof.

The tracks per inch (TPI) track density on a disc may influence the BPI recording density which may be used without encountering read errors. For example, as TPI increases, the SNR may decrease. This can be due in part to factors such as adjacent track interference (ATI), where data recorded to one track may influence a head's ability to read data recorded to nearby tracks. Therefore, in order to maintain an acceptable BER, BPI may be reduced where TPI is greater (i.e. for tracks having narrow widths) or increased where TPI is lower (i.e. for tracks having greater widths). One method of increasing TPI is to use shingled recording methods.

Figure 3A:
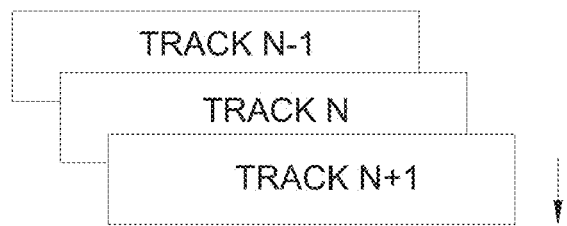
FIGS. 3A and 3B are diagrams of examples of a system having recording density variation of data tracks, in accordance with certain embodiments of the present disclosure.
Figure 3B:
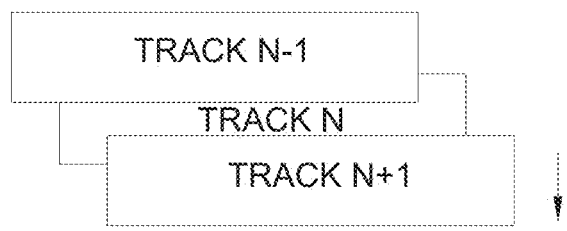

FIGS. 3A and 3B are diagrams of examples of a system having recording density variation of data tracks, in accordance with certain embodiments of the present disclosure. In particular, FIGS. 3A and 3B show an example of shingled recording tracks. In some embodiments, such as with shingled magnetic recording (SMR), each track may partially overlap an adjacent track. Data may be recorded one track at a time in a sequential order, where data may only be written in a specified direction (e.g. first track N−1, then track N, then track N+1, etc.). The shingle write direction may be referred to as the "positive" direction, while the opposite writing direction may be referred to as the "negative" direction.

Referring to FIG. 3A, if it is assumed that writing is performed in the arrow-indicated positive direction in the shingle-write scheme, when writing to track N, adjacent track N−1 may be partially overwritten. Similarly, when writing is performed on track N+1, adjacent track N may be partially overwritten. In contrast to recording methods where each track is written without any intentional overlap, SMR may result in increased recording density due to a higher (TPI) characteristic in a radial direction of a storage medium.

As illustrated in FIG. 3B, after writing on track N, if track N−1 is written in the negative direction, opposite to the positive shingled recording direction indicated by the arrow, track N may become unreadable due to Adjacent Track Interference (ATI), or being partially overwritten by both adjacent tracks (i.e. track N−1 and track N+1). Therefore, it may be advantageous to follow a constraint that track N−1 should not be written after track N is written. Accordingly, writing or modifying data on track N−1 after track N is recorded, or on track N after track N+1 is recorded, may require a different writing strategy than with non-shingled tracks, which can simply be overwritten at any time.

It should be understood that the positive recording direction may be from the inner diameter (ID) to the outer diameter (OD) of the recording medium, or vice versa. The positive direction may even be different per zone or per shingled recording band, where a shingled band may be a set of shingled tracks. For example, the positive recording direction may be selected for a given set of tracks based on a write head's writing capabilities in different directions at different points over a recording medium.

Figure 4:
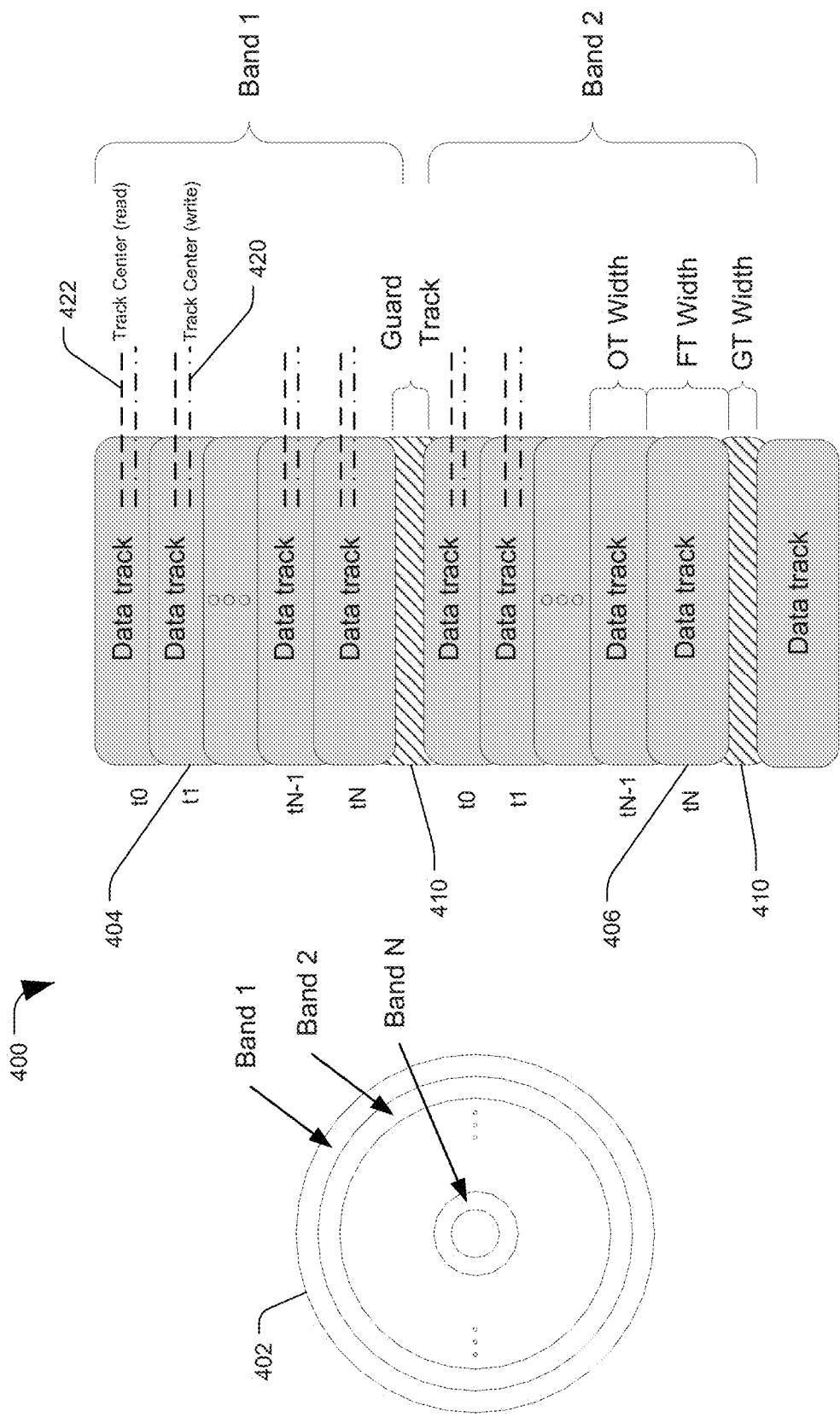
FIG. 4 is a diagram of a system having recording density variation of data tracks, in accordance with certain embodiments of the present disclosure.

FIG. 4 is a diagram of a system 400 having recording density variation of data tracks, in accordance with certain embodiments of the present disclosure. Due to the track write overlap of SMR, writing a given track N−1 after track N has been written may require rewriting all shingled tracks that following track N−1 (i.e. track N, track N+1, track N+2, etc.). In order to accomplish this realistically, a set of shingled tracks may be grouped into a "band," such that writing the last track of a given band X does not require rewriting any of the following tracks in bands X+1, X+2, X+3 and so on. Rotating disc media 402 may be divided into a plurality of bands (e.g. Band 1, Band 2, etc.), and each band may contain a plurality of shingled data tracks. In some embodiments, a disc may be divided into a plurality of data zones including a plurality of tracks, and each data zone may include one or more shingled recording bands.

Separating bands so that rewriting one does not require rewriting tracks outside the band can be accomplished by defining the tracks such that the last track of a band is not trimmed or overlapped by a track that can be written. The last track of a band may be referred to as a "fat track," since it is not overlapped by another track to reduce its width. Fat tracks can be achieved in a number of ways. For example, track spacing may be formatted so that the last track of each band does not have an overlapping track adjacent. However, this may require two or more different track pitches for bands, with a first for shingled tracks and a second pitch for end-of-band tracks that are not to be partially overwritten.

In some embodiments, one or more tracks following each end-of-band fat track can be designated as "not to be written." Bands may have a number of shingled tracks 404, such as tracks t0 through tN−1 of FIG. 4, which are partially overlapped by adjacent tracks and have a reduced track width. For example, the shingled or overlapped tracks 404 may have a reduced read width relative to their write width. For example, the write center 420 of a track may be centered on the entire track, including both the shingled and the unshingled portions of the track, while the read center 422 of a shingled track may be centered over only the unshingled portion of the track. When discussing write centerlines 420 and read centerlines 422, the centering of the lines may be approximate, for example based on writer to reader offset and head skew. "Track width" or "width" as used herein may refer to the unshingled portion of a track, unless otherwise specified. Bands may also end with an unshingled "fat" track 406, such as track tN of FIG. 4, which does not have a reduced track width. For example, the read center 422 of the fat track 406 may be approximately the same as the write center 420, accounting writer to reader offset, head skew, or other factors. In some embodiments, the read center 422 for fat tracks 406 may offset from the write center 420 as with the shingled tracks 404 in the band, so that the same head positioning algorithms may be applied to all writable tracks in a band.

Because the last track 406 is not overlapped by a writable track, the band can be rewritten without affecting tracks outside the band. The last track 406 of each band may be followed by a "not-to-be-written" track 410, preventing the last track 406 from being partially overwritten. Not-to-be-written tracks may be referred to as "guard tracks" 410, as they provide band boundaries to separate writable tracks of different bands and guard the last track 406 of a band from being trimmed by or trimming tracks outside the band. When track t0 of Band 1 needs to be re-written, tracks t0 to the fat track tN 406 of Band 1 can be rewritten, while tracks in other bands, such as Band 2, are not affected. In some embodiments, a single guard track 410 may be used, while in some embodiments multiple tracks may be designated as "not to be written" between bands to provide a larger buffer against ATI. A guard track 410 or set of contiguous guard tracks may also be referred to as a guard band or isolation track.

In some embodiments, the guard track 410 between bands can be a full non-shingled track (i.e. a track not trimmed by either adjacent track), but this may again require different track pitches for the shingled tracks and for the guard tracks. In other embodiments, a guard track 410 may have the same pitch as other shingled tracks, but not be used to store data, so it does not matter that the guard track 410 is overlapped by both adjacent tracks. In other words, all writable tracks and guard tracks may have the same write pitch (e.g. the distance between a track centerline that would be followed by a write head during write operations and a write centerline of an adjacent track). In some embodiments of a disc with multiple bands per zone, each zone may contain 110 tracks, and the 110 tracks may be divided into 10 bands containing 10 data tracks and 1 guard track each. Other configurations are also possible. For example, multiple shingled guard tracks (e.g. having the same pitch as the data tracks) may be included between each band. While tracks herein are described as having a uniform or consistent track pitch, it should be understood that different track pitches may also be used without departing from the scope of this disclosure. For example, tracks in different data zones or bands may have different track pitches, or fat tracks or guard tracks within a band or zone may have different track pitches. In some embodiments, the first shingled track of a band may have a modified track pitch from other shingled tracks in the band, to account for possible overlap or interference by write operations to adjacent bands. Other embodiments are also possible.

Guard tracks 410 may be overlapped by both adjacent tracks without loss of data, as data may not be recorded to guard tracks. Accordingly, while all tracks may share the same write pitch or write track center when defined on the disc, a band may include multiple track widths in practice, sometimes called "functional" track widths. These track widths or "functional" track width may be used to refer to the width of a non-overlapped portion of a track. As shown in FIG. 4, trimmed tracks 404 may have a first functional width due to being partially overlapped in one direction, denoted as "OT (overlapped track) Width." The last data tracks 406 in each band, or "fat tracks," may have a second functional track width due to not being overlapped in either direction, denoted as "FT (fat track) Width." The guard tracks 410 may have a third functional track width due to being overlapped in both directions, denoted as "GT (guard track) Width."

As discussed previously, a higher tracks per inch (TPI) may generally reduce the signal-to-noise ratio (SNR), and increase a bit error rate (BER). This can be due to a reduced track pitch or width of each track. Similarly, increasing a bits per inch (BPI) value on each track may likewise increase the BER. To maintain a desired BER, the TPI and BPI values of a data storage medium can be balanced. However, in shingled recording, the shingled tracks may have a first width while the fat tracks may have a second, wider track width. Therefore, the fat tracks can support a higher BPI than the narrower shingled tracks without compromising a desired BER. By setting a first, higher BPI data recording rate for fat tracks than the BPI rate of shingled tracks, the areal density capability of a storage medium may be increased.

Figure 5:
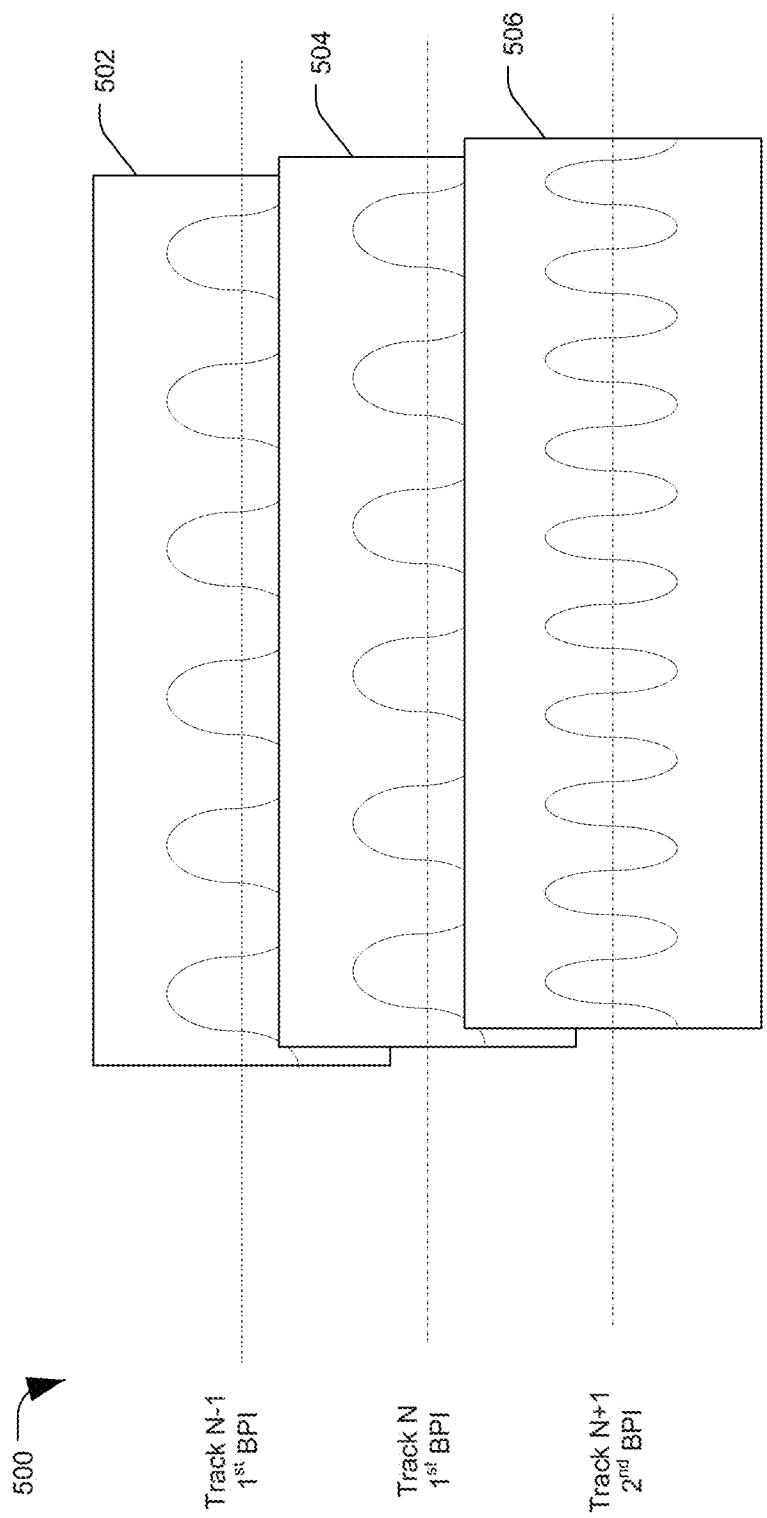
FIG. 5 is a diagram of a system having recording density variation of data tracks, in accordance with certain embodiments of the present disclosure.

FIG. 5 is a diagram of a system 500 having recording density variation of data tracks, in accordance with certain embodiments of the present disclosure. System 500 may include the last three tracks (track N−1 502, track N 504, and track N+1 506) of a shingled band, according to some embodiments. Track N−1 502 and track N 504 may both be partially overlapped by adjacent tracks, reducing their track widths. Track N+1 506 may be a fat track that is not partially overlapped by any adjacent tracks, and may therefore have an unreduced track width. When recording data to tracks N−1 502, N 504, and N+1 506, a data storage device may select a recording frequency to use to record the data. The recording or write frequency may determine the BPI of data stored to the track. In some embodiments, a first BPI rate may be used to store data to trimmed tracks N−1 502 and N 504. In some embodiments, a second BPI rate may be used to record data to fat track N+1 506, which second BPI rate may be higher than the first BPI rate.

In some embodiments, BPI settings may be selected for a data storage device by performing read and write performance testing, such as a bit aspect ratio test. Performance testing and BPI selection may be performed during a manufacturing process for a DSD. In some embodiments, final formatting and BPI selection may be performed by the DSD in the field, after the device has shipped.

Figure 6:
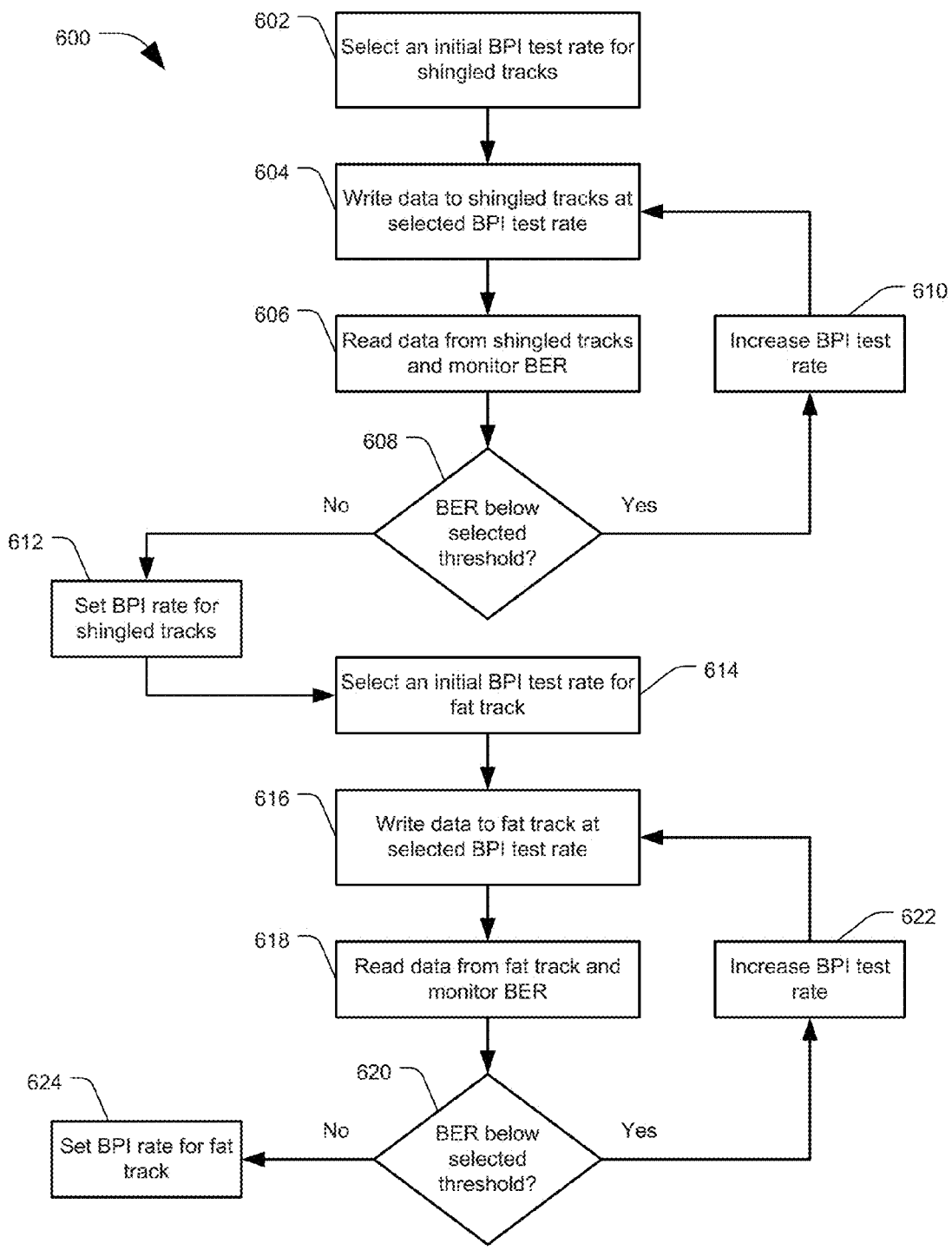
FIG. 6 is a flowchart of a method for recording density variation of data tracks, in accordance with certain embodiments of the present disclosure.

FIG. 6 is a flowchart of a method 600 for recording density variation of data tracks, in accordance with certain embodiments of the present disclosure. Method 600 may describe some potential embodiments of a read and write performance test or other performance test to select a desired BPI for shingled and fat tracks. In some embodiments, method 600 may be integrated into one or more performance tests to select other characters of a DSD, such as the TPI values. In some embodiments, a TPI value may have already been selected for a storage medium, and data tracks may already be defined on the medium.

Method 600 may include selecting an initial BPI test rate for shingled tracks, at 602. For example, shingled tracks may be tracks which are partially overlapped by an adjacent track, such as tracks 404 of FIG. 4. The initial BPI test rate may include a relatively low BPI rate that is unlikely to result in a high bit error rate (BER) when data is read back.

Method 600 may include writing data to shingled track(s) at the selected BPI rate, at 604. Writing at a selected BPI rate may include selecting a frequency at which a write head records data to a data storage track. A higher BPI rate may mean more data is recorded to a track or a selected portion of the track, while a lower BPI rate may mean recording less data to the track or the selected portion.

At 608, the method 600 may include reading the data from the shingled track(s) and monitoring a BER of the read data. The BER may be based on a number of errors in the data that was read from the track compared to the data that was written to the track. The method 600 may include determining whether the detected BER is below a selected threshold, at 608. For example, the selected threshold may be a desired performance threshold, or target error rate, to balance areal density capability (ADC) of a storage medium against read and write performance.

If the BER is below the selected threshold, at 608, the method 600 may include increasing the BPI test rate, at 610. For example, if the initial BPI test rate involved writing data at 1000 kilobits per inch (KBPI), the method 600 may include increasing the test rate to 1010 KBPI. The method 600 may then repeat the writing operation, at 604.

If the BER is not below the selected threshold, at 608, the method 600 may include setting a BPI rate for the shingled tracks, at 612. For example, the selected BPI value may be the last BPI test rate that did not exceed the BER, or the first BPI that did exceed the BER (for example, if the selected BER threshold was lower than an acceptable operating BER rate of the DSD). The selected BPI value may be stored to a memory of the DSD, such as a ROM or a portion of a hard disc not accessible to users, so that it can be referenced by the DSD for write operations. In some embodiments, the value may be stored to a RAP (read/write adaptive parameter) table stored to memory. BPI values (e.g. for both shingled and fat tracks) and other channel adaptive values may be stored to the RAP table based on, e.g. each head/surface combination of the data storage medium, each zone of a disc, each shingled band, based on other delineations, or any combination thereof.

Method 600 may next involve selecting an initial BPI test rate for one or more fat tracks, at 614, and writing data to one or more fat tracks at the selected BPI test rate, at 616. For example, the test may write data to a single fat track at the end of a shingled band, or a plurality of different fat tracks. In some embodiments, any track in a shingled band may be written to as part of the fat track performance test, provided that track is not partially overlapped by writing to an adjacent track. For example, a test of fat track performance may include writing data to every other track in a shingled band, provided those tracks do not partially overlap each other and no data is written to the interstitial tracks.

The method 600 may include reading data from the written fat tracks and monitoring the BER, at 618. If the monitored BER is below a selected threshold, at 620, the method 600 may include increasing the BPI test rate, at 622. If the monitored BER exceeds the selected threshold, the method 600 may include setting the BPI rate for one or more fat tracks, at 624. As stated above, testing and BPI values may be set based on disc surface, zone, shingled band, other delineations, or any combination thereof. In embodiments where testing is performed per zone, the selected fat track BPI may be applied to the fat track of each shingled band within a zone. In embodiments where testing is performed per shingled band, the fat track BPI may be applied for only the single fat track of the tested band. Other embodiments are also possible.

In some embodiments, performance testing may be an iterative process for selecting and balancing both BPI and TPI across multiple or all data zones of a drive. For example, BPI and TPI may be balanced to meet a desired storage capacity for a drive while staying within acceptable performance specifications. The testing process may be initialized using an estimate of the gain from employing a higher BPI on the fat tracks. After performing read and write testing to select the actual BPI of the fat tracks, final formatting of the drive may be adjusted, if necessary, to meet the desired storage capacity.

In some embodiments, the shingled BPI rate may be stored based on specified tracks. For example, if each shingled band includes 9 overlapped tracks and one fat track, a BPI table may be organized to group tracks 1-9 with a first BPI, and track 10 with a second BPI. In some embodiments, each shingled band in a zone may include 20 tracks, with 19 overlapped tracks and one fat track. A table may list a first BPI rate for shingled tracks and a second BPI rate for fat tracks. In some embodiments, a modulo operation ("mod"), which finds the remainder of a division of one number by another number, may be applied to determine which recording density to apply to a target track. For example, a data storage device may determine which BPI rate to apply based on an equation of:

$$[\text{Current Track Number}] \bmod [\text{Number of Tracks per Band}]$$

For example, if there are 20 tracks in a band, the DSD may perform a calculation of [Current Track Number] mod 20. When the result is nonzero (i.e. with any Current Track Number not divisible by 20), the first BPI rate may be applied. When the result is 0 (i.e. with any Current Track Number divisible by 20), the second BPI rate may be applied. Other embodiments are also possible.

In some embodiments, rather than storing a BPI rate for shingled tracks and a BPI rate for fat tracks, the DSD may only store a single BPI rate for a given area of a storage medium. For example, the DSD may only store a first BPI rate for shingled tracks. The DSD may calculate a BPI rate for fat tracks based on the shingled BPI rate (e.g. the fat track BPI rate may be the shingled BPI rate *1.3). Other embodiments or also possible. The DSD may use the determined BPI value to perform data recording operations to the storage medium.

Figure 7:
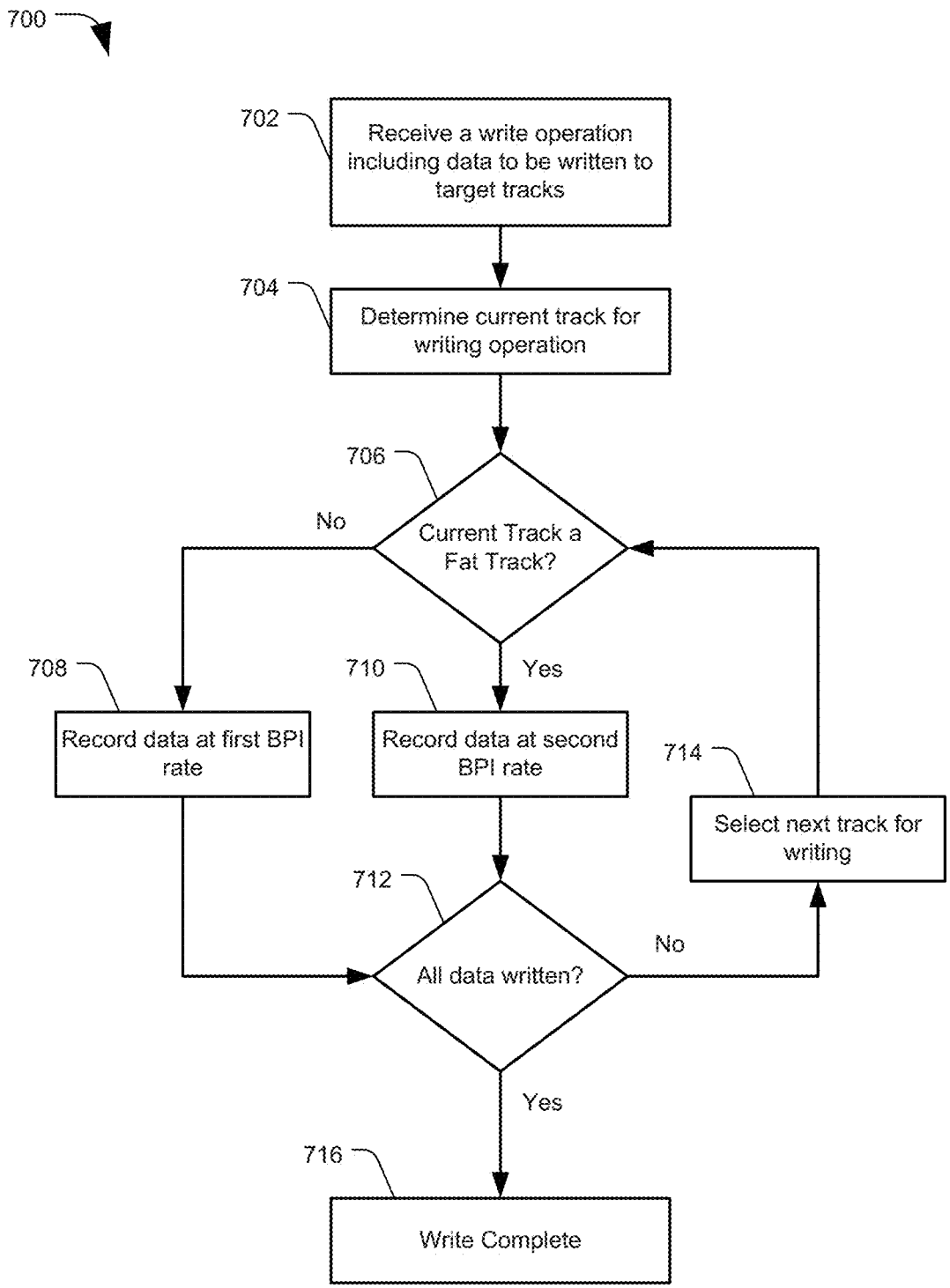
FIG. 7 is a flowchart of a method for recording density variation of data tracks, in accordance with certain embodiments of the present disclosure.

FIG. 7 is a flowchart of a method 700 for recording density variation of data tracks, in accordance with certain embodiments of the present disclosure. Method 700 may include receiving a write operation including data to be written to one or more target tracks, at 702. For example, a DSD may receive a write command and associated data to store to a storage medium of the DSD. The DSD may determine which tracks and physical sectors in which to store the data. A current track for the writing operation may be determined, at 704. For example, the write operation may select a track of a shingled band in which to write data.

The method 700 may include determining whether the current track is a fat track, e.g. a data track that is not partially overlapped by an adjacent track, at 706. If the current track is not a fat track, the method 700 may include recording data at a first write frequency, or BPI rate, at 708. For example, a DSD may consult a table listing a BPI rate for the target shingled track, or the DSD may calculate the BPI rate based on another stored BPI rate. Once the appropriate BPI rate has been determined, data may be stored to the track at the determined rate. If the current track is a fat track, at 706, the method may include recording data to the track at a second BPI rate. The second BPI rate may correspond to fat tracks, and may be stored in a table, derived from another BPI rate, or otherwise selected.

The method 700 may include determining whether all data for the write operation has been written, at 712. If not, a next track for writing may be selected, at 714. For example, when writing to a shingled band of tracks, the track immediately following the previous track in the positive shingled recording direction may be selected. The method 700 may continue with determining whether the new current track is a fat track, at 706. When a determination is made that all data has been written, at 712, the method may end the write operation, at 716.

It should be noted that while many of the examples and illustrative embodiments have been directed at shingled recording mediums, and the corresponding overlapped tracks and fat tracks, the present disclosure is not limited to those embodiments. Recording density variations of data tracks, as described herein, may be applied to non-shingled recording systems as well. For example, some storage mediums may be configured to have varying track widths or pitches across a disc surface (e.g. a higher TPI at an outer diameter (OD) of a disc, and a lower TPI at an inner diameter (ID) of a disc). In some embodiments, selected tracks within a zone may have a higher track pitch or track width than other tracks in the zone, for example if the selected tracks are designated for storing important data. In some embodiments, a zone or other area of a data storage medium may have more than two different track pitches or track widths, and may accordingly apply three or more different BPIs when storing data to the various tracks. Different BPI rates may be selected for different tracks depending on their individual track widths or track pitches, in both shingled and non-shingled recording schemes.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit configured to:
   record data to a first track of a data zone at a first recording frequency with a corresponding first bits per inch (BPI) down track recording density, a data zone including a plurality of contiguous tracks numbering less than all tracks on a recording medium surface; and record data to a second track of the data zone at a second recording frequency with a corresponding second BPI down track recording density different from the first recording density.

2. The apparatus of claim 1 further comprising:
the first track has a first track width;
the second track has a second track width greater than the first track width; and
the second recording frequency is greater than the first recording frequency.

3. The apparatus of claim 2, the circuit further configured to:
select the first recording frequency based on the first track width; and
select the second recording frequency based on the second track width.

4. An apparatus comprising:
a circuit configured to:
record data to a first track of a data zone at a first recording density, a data zone including a plurality of tracks numbering less than all tracks on a recording medium surface;
record data to a second track of the data zone at second recording density different from the first recording density;
the first track has a first track width;
the second track has a second track width greater than the first track width;
the second recording density is greater than the first recording density;
the first track and the second track are part of a set of shingled tracks where one track partially overlaps an adjacent track;
the second track partially overlaps the first track; and
the second track is not partially overlapped by another track.

5. The apparatus of claim 4 further comprising:
the data zone includes a plurality of shingled bands, each shingled band including a selected number of shingled tracks;
the circuit further configured to:
record data at the first recording density to tracks of a selected shingled band, the tracks not including a final track of the selected shingled band; and
record data at the second recording density to the final track of the selected shingled band, which is not overlapped by another track.

6. The apparatus of claim 5, the circuit further configured to:
select between the first recording density and the second recording density at which to record a target track based on performing a modulo operation including: a track number of the target track modulo the selected number of shingled tracks in a shingled band;
apply the first recording density when a result of the modulo operation is nonzero; and
apply the second recording density when the result of the modulo operation is zero.

7. The apparatus of claim 1, the circuit further configured to:
receive a write command from a host device, including data to be written to the first track and the second track;
retrieve a table stored to a memory, the table including recording density values; and
determine the first recording density based on the table.

8. The apparatus of claim 7, the circuit further configured to:
determine the second recording density by applying a multiplier to the first recording density.

9. An apparatus comprising:
a data storage medium including a shingled recording band including a plurality of adjacent tracks numbering less than all the tracks on a recording surface of the data storage medium, the shingled recording band having:
a first track recorded at a first bits per inch (BPI) value;
a second track recorded at a second BPI value different from the first BPI value;
the first track and the second track are part of a set of shingled tracks where one track partially overlaps an adjacent track;
the second track partially overlaps the first track; and
the second track is not partially overlapped by another track.

10. The apparatus of claim 9 further comprising:
the first track has a first track width; and
the second track has a second track width greater than the first track width.

11. The apparatus of claim 10 further comprising:
the first track recorded at a first down track recording frequency corresponding with the first BPI value; and
the second track recorded at a second down track recording frequency corresponding with the second BPI value.

12. The apparatus of claim 10 further comprising:
the data storage medium includes a plurality of shingled bands, a shingled band including a selected number of shingled tracks;
a processor configured to:
record data at the first BPI recording density value to tracks in a selected shingled band not including a final track of the selected shingled band; and
record data at the second BPI recording density value to the final track of the selected shingled band.

13. The apparatus of claim 10, further comprising:
a processor configured to receive a write command from a host device, including data to be written to the first track and the second track.

14. The apparatus of claim 13, the processor further configured to:
select the first BPI value based on the first track width; and
select the second BPI value based on the second track width.

15. The apparatus of claim 13, the processor further configured to:
retrieve a table stored to a memory including BPI values; and
determine the first BPI value based on the table.

16. The apparatus of claim 15, the processor further configured to:
determine the second BPI value based on the first BPI value.

17. An apparatus comprising a memory device storing instructions that, when executed, cause a processor to perform a method comprising:
writing data to a first track of a selected data zone at a first recording frequency with a corresponding first down track bits per inch (BPI) recording density, a data zone comprising a plurality of concentric tracks numbering less than all the tracks on a recording medium surface; and
writing data to a second track of the selected data zone at second recording frequency with a corresponding second down track BPI recording density different from the first recording density.

18. The apparatus of claim 17, the memory device storing instructions that, when executed, cause the processor to perform the method further comprising:
  selecting the first recording density based on the first track having a first track width; and
  selecting the second bit density based on the second track having a second track width greater than the first track width.

19. The apparatus of claim 18, the memory device storing instructions that, when executed, cause the processor to perform the method further comprising:
  writing data to the first track and to the second track in a shingled manner so that the second track partially overlaps the first track and the second track is not partially overlapped by a third track.

20. The apparatus of claim 19, the memory device storing instructions that, when executed, cause the processor to perform the method further comprising:
  writing data to shingled recording bands of a selected number of tracks;
  selecting between the first recording density and the second recording density at which to write to a target track based on performing a modulo operation including: a track number of the target track modulo the selected number of tracks in a shingled band;
  applying the first recording density when a result of the modulo operation is nonzero; and
  applying the second recording density when the result of the modulo operation is zero.

* * * * *